H. C. ATKINSON.
Roasting-Oven.
No. 219,429. Patented Sept. 9, 1879.
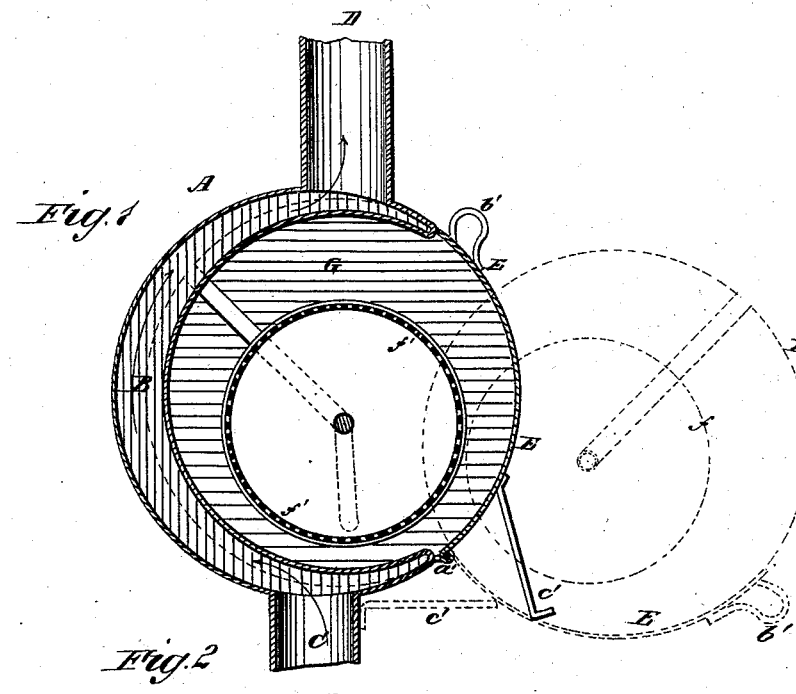
Fig. 1
Fig. 2
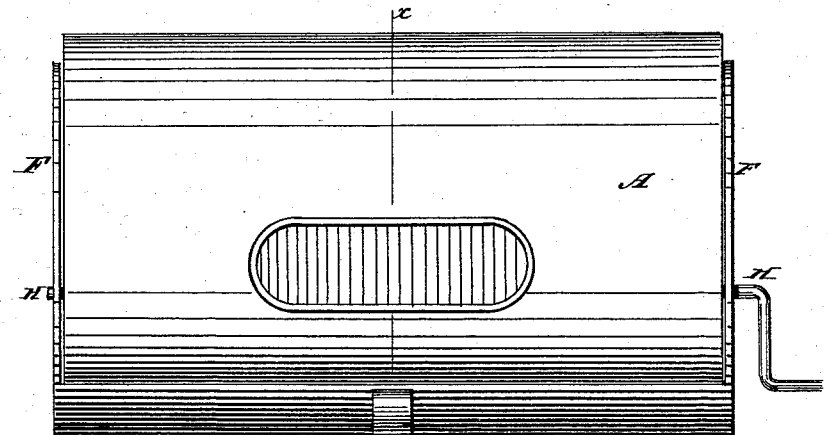
Fig. 3.
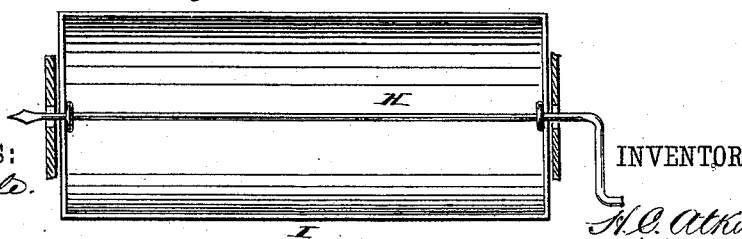
WITNESSES:
F. McArdle.
C. Sedgwick.
INVENTOR:
H. C. Atkinson
BY Munn & Co.
ATTORNEYS.
N. PETERS, PHOTO-LITHOGRAPHER, WASHINGTON, D. C.

UNITED STATES PATENT OFFICE.

HENRY C. ATKINSON, OF FRANKLIN, KENTUCKY.

IMPROVEMENT IN ROASTING-OVENS.

Specification forming part of Letters Patent No. 219,429, dated September 9, 1879; application filed March 27, 1879.

*To all whom it may concern:*

Be it known that I, HENRY C. ATKINSON, of Franklin, in the county of Simpson and State of Kentucky, have invented a new and Improved Roasting-Oven, of which the following is a specification.

Figure 1 is a vertical sectional elevation of the oven through line $x\ x$, Fig. 2. Fig. 2 is a plan of the oven. Fig. 3 is a plan of the dripping-pan.

Similar letters of reference indicate corresponding parts.

The object of this invention is to provide an oven to be placed on the outside of a stove or range, for cooking purposes.

The oven is a removable one, and is to be set on the collar of a cooking stove or range.

A is a cylinder, having a smoke or flame chamber, B, within it, extending the entire length and somewhat more than half the circumference of the cylinder. Communicating with this chamber, are pipe C, that fits upon the collar of the stove, and through which the products of combustion pass from the stove into the chamber, and pipe D, through which they escape from the chamber; and it is by the heat given off by these products of combustion in their passage through the chamber that the contents of the oven are cooked.

The longitudinal section E of the shell, that is not involved in the hot-air chamber, is converted into a door by being hinged at $a'$. Its handle and supporting-leg are shown at $b'$ and $c'$, respectively.

Attached to the ends of the door are disks F F, that form the ends of the oven proper, G, as that space in the cylinder is called that is not occupied by the chamber B.

A hole nearly in the center of one of the disks and a slot in the other permit the introduction of a spit or crank-shaft, H, to pass longitudinally through the axis of the oven. Centered upon this crank-shaft or spit may be a wire cylinder, (shown at $f'\ f'$,) for popping corn and for other purposes; or a semi-cylindrical dripping-pan, I, may be suspended from it, to catch the drippings from any article placed to cook upon the spit.

The door and attachments are opened or turned, as shown in dotted lines, Fig. 1, when it is desired to put anything into or remove anything from the oven, for as the door is opened whatever is cooking in the oven is brought out with it, and as it is closed it carries into the oven whatever may be on the spit or crank-shaft.

It will be seen that the dripping-pan hangs so loosely on the spit that it will always hang downward under the spit and article cooking upon it.

The advantages of this arrangement of door and spit or crank-shaft are very apparent. It enables me to remove objects from the oven without handling them, and to at any time inspect them without trouble.

The oven proper, G, is eccentrically placed in the cylinder A to make room for the crescent-shaped hot-air chamber B, and to make possible the construction of a door, E, extending the whole length of the cylinder.

Having thus described my invention, I claim as new and desire to secure by Letters Patent—

1. The improved roasting-oven, consisting of cylinder A, chamber B, pipes C and D, door E, and disks F F, substantially as herein shown and described.

2. The hinged door E, with disks F F and spit H, in combination with the oven proper, G, substantially as herein shown and described.

3. In a roasting-oven to be used on the outside of a stove or range, and attached to the collar thereof, the crescent-shaped smoke-chamber B, and eccentric oven proper, G, in combination with door E and disks F F, substantially as herein shown and described.

HENRY CATE ATKINSON.

Witnesses:
T. S. BARNES,
G. K. BARNES.